Dec. 28, 1926.
W. F. HENDERSON ET AL
APPARATUS AND METHOD FOR TREATING SAUSAGE CASINGS
Filed April 14, 1926
1,612,508
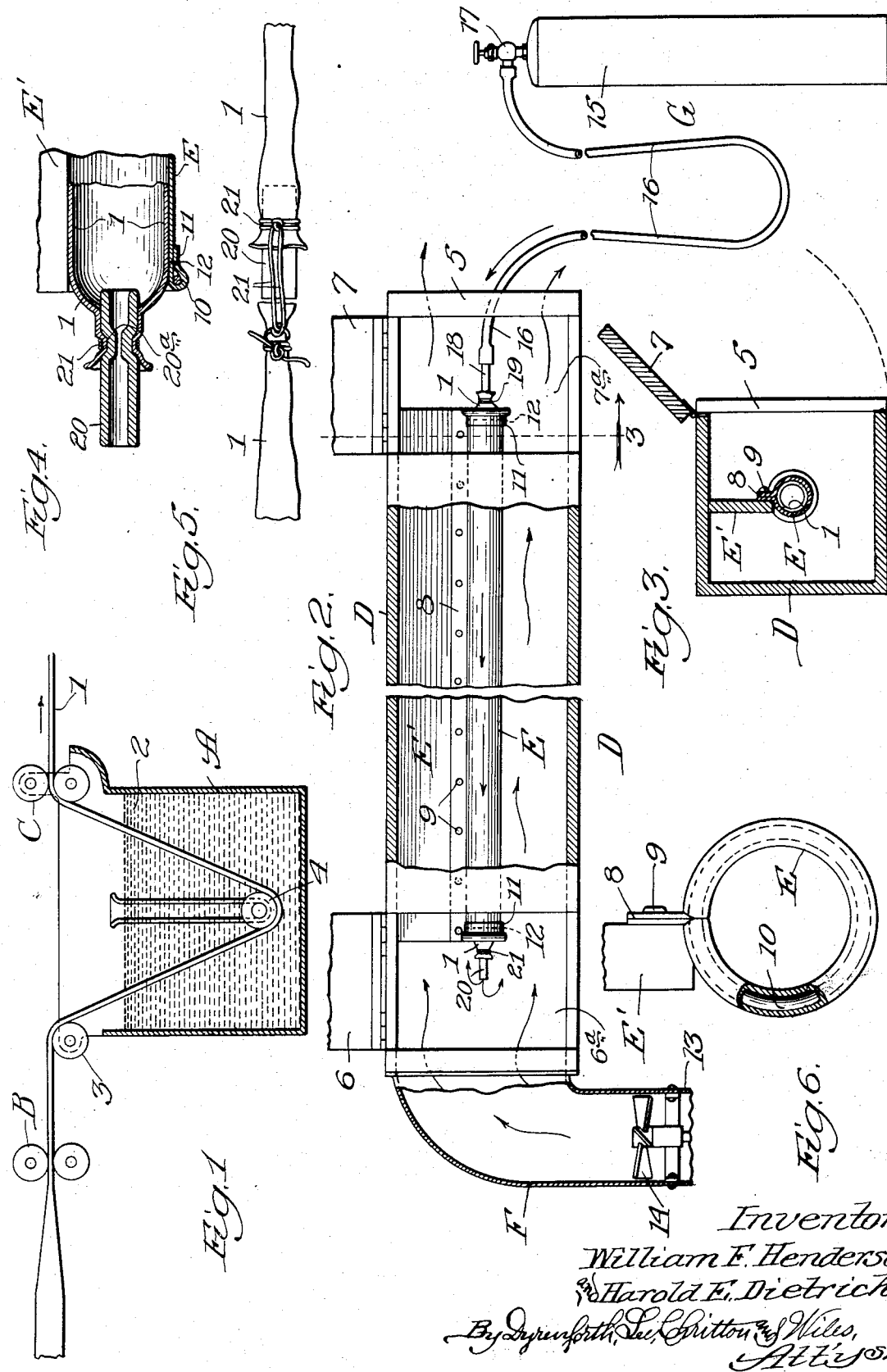

Patented Dec. 28, 1926.

1,612,508

UNITED STATES PATENT OFFICE.

WILLIAM F. HENDERSON AND HAROLD E. DIETRICH, OF CHICAGO, ILLINOIS, ASSIGNORS TO THE VISKING CORPORATION, OF RICHMOND, VIRGINIA, A CORPORATION OF VIRGINIA.

APPARATUS AND METHOD FOR TREATING SAUSAGE CASINGS.

Application filed April 14, 1926. Serial No. 101,958.

This invention relates particularly to a method and apparatus for treating sausage casings, or the like, composed of cellulose, or cellulose hydrate.

The primary object of the invention is the production of an improved sausage casing which can be kept in stock for a long period, without deterioration, which is thin-walled and strong, which can be made of uniform predetermined diameter and which can be used successfully in a packing house and does not require the use of a lubricant to cause the casing to slip easily and smoothly from the horn during the operation of filling the casing with meat.

A further object is to provide an artificial casing of this character which, while substantially dry and possessing great strength, nevertheless contains a hygroscopic ingredient in just sufficient quantity to maintain a desirable degree of moisture in the casing. so that the casing will be pliable and free from brittleness and possess the necessary toughness to permit the casing to be stuffed tightly without bursting.

It may be stated preliminarily that a cellulose casing which is wet, or quite moist, will not slip readily over the surface of the stuffer horn, but tends to cling firmly to the surface of the horn. On the other hand, such a casing, if bone dry, is liable to crack or tear, and cannot be handled advantageously. Moreover, it has been found important, in drying casings of this character, to effect the drying operation while the casing is maintained in extended condition within a suitable confining wall, which preferably is porous, or foraminous, to facilitate the drying operation. The present invention accomplishes the important result here indicated.

Methods of producing viscose for producing a cellulose casing, and then extruding and, if desired, drawing, the viscose to form a casing, are known. A method of extruding a viscose tube and subjecting it to a pulling action during the period of extrusion is described in a previous application of William F. Henderson, Serial No. 630,594, filed April 7, 1923. By such a method, it is possible to produce a tube having an exceedingly thin wall, as, for example, a wall of considerably less than one-thousandth of an inch, dry.

The following may be stated as a satisfactory method of producing a viscose material from which a cellulose hydrate casing can be formed:

Treat 600 grams of cotton with 4000 grams of 20% sodium hydroxide solution for 25 minutes; press out the excess alkali until the cake weighs 2000 grams; shred the cake and place the shredded material in a sealed container with 300 grams of carbon bisulfide for 3 hours, at 25° C. The orange product is dumped into a mixer and 1500 grams of water containing 40 grams of alkali are added. When this is well mixed, more water is added until the total weight is 8440 grams. After the mixing is complete, the viscose is poured into jars, sealed, and placed in the ripening room until it is ready for use.

Material prepared as described above may be introduced into suitable apparatus and extruded in the form of a tube, the extruding operation being carried on conjointly, if desired, with a pulling, or stretching, operation to form a very thin-walled casing. The casing, as it is extruded, may be subjected to the action of a coagulating fluid, and may then be passed through purifying baths, and it will then be ready for treatment in accordance with the process to be described herein.

The accompanying drawing illustrates novel apparatus suitable for carrying out the improved casing-treating process, which is designed to provide a finished sausage casing which can be immediately filled with meat, or which can be kept in storage for an indefinite period without deterioration, and stuffed to meet requirements.

In the drawings, Fig. 1 represents a vertical sectional view of apparatus for expressing from the sausage casing the liquid which it carries from the purifying bath, immersing the casing in a dilute solution of glycerin, and expressing from the casing the excess glycerin solution; Fig. 2, a broken vertical sectional view of suitable drying apparatus; Fig. 3, a vertical transverse sectional view taken as indicated at line 3 of Fig. 2; Fig. 4, a broken sectional view of the advance end portion of the sausage casing while it is inflated within a suitable confining tube; Fig. 5, a fragmentary view illustrating the manner in which the advance end of a wet casing may be secured to the rear end of a dried casing so that the wet casing will be drawn into the confining tube through the medium of the dried casing while the latter is being withdrawn from the confining tube; and Fig. 6, an end elevational view of the confining tube with a portion broken away.

In the illustration given, A designates a vat containing a fluid adapted to introduce an ingredient of hygroscopic character into the material of the sausage casing, which is designated 1, said fluid being preferably a 20% solution of glycerin and water; B designates a pair of rolls through which the casing is drawn from the last purifying bath; and C designates a pair of rolls for expressing from the casing the excess glycerin solution as the casing emerges from the bath, which is designated 2. The casing is guided over a roll 3 and under a roll 4 in passing through the vessel A.

Also, in the illustration given, D designates a drying chamber which may be conveniently thirty-five to fifty feet in length; E, a casing-confining tube preferably composed of an open-weave fabric, such as voile, said tube being suspended from a strip-like support E' depending from the top-wall of the drying chamber; F, a blower device for circulating heated air through the chamber D; and G, means for inflating the casing 1 while it is within the confining tube E.

The drying chamber D may be of any suitable form and construction. In the illustration given, it is in the form of an elongated rectangular box having the blower F attached at one end and having the other end open, as indicated at 5. Near its ends, the box is provided at one side with doors 6 and 7 which may be lifted to provide openings 6$^a$ and 7$^a$ for convenience in introducing and removing the sections of the sausage casing.

The casing-confining tube E preferably is formed from a strip of porous cloth which is folded upon itself and has its margins 8 secured to the supporting strip E' by means of tacks 9. The loop of cloth may be expanded into tubular form by means of rings 10 applied at the ends. The end portion of the cloth loop may be inserted through the ring and folded back over the ring, as indicated at 11, and stitched, as indicated at 12.

The blower F may receive a supply of dry warm air from any suitable source (not shown) with which the pipe 13 connects. The pipe 13 is shown fitted with a fan 14.

Any suitable pressure apparatus G may be employed for inflating the sausage casing. In the illustration given, an air pressure tank 15 communicating with a hose 16 through a valve 17 is shown. The hose 16 is fitted at its free end with a small tube 18. As shown in Fig. 2, the rear end of the sausage casing is collapsed upon the tube 18 and secured thereto in any suitable manner, as by means of a rubber band 19.

At the advance end, the sausage casing has inserted therein a small glass tube 20 having a constriction 20$^a$. The advance end of the casing is secured to the constricted portion of the tube by means of a string 21.

In Fig. 5, the left hand casing 1 is assumed to be a dry casing and the right hand tube 1 is assumed to be a wet casing. In the first instance, a casing may be introduced into the confining tube E by passing a lead string through the confining tube and using it to draw the casing into the tube. After the tube has thus been introduced and dried, the pressure is released by disconnecting the tube 18 from the rear end of the casing. The dried casing then collapses, and the string 21 at the advance end of the fresh casing may be tied to the rear end of the dried casing, so that the dried casing may be used as a means for drawing the wet casing into the confining tube. It will be understood that each wet casing is preparatorily equipped with a tube 20 having a constriction therein; and it will be understood further that after the wet casing has been drawn into the confining tube, the pressure apparatus is connected with the rear end of the casing and employed to maintain a gentle inflating pressure within the casing while the casing is being dried. The tank 15 may receive a supply of dried moderately heated air from any suitable source, not shown.

In practice, it is preferred to have the confining tube E of slightly greater diameter than the diameter of the sausage casing as received from the vat A. After the casing has been introduced within the confining tube, it is subjected to gentle inflating pressure which preferably is such as to distend, or stretch, the tube slightly. The distention is limited, however, by the walls of the confining tube. The distending action is sufficient to remove the possibility of any folds, or wrinkles, in the casing, and may be sufficient to slightly enlarge the diameter of the casing, which tends to further thin the casing walls.

The drying action takes place while the sausage casing is thus distended and confined, so that the characteristic shrinking of a cellulose casing during the drying operation is obviated. Bulging of the casing is also prevented, and a casing of uniform diameter results.

It should be added that it is quite possible to distend the casing greatly beyond the shrunken diameter which follows extrusion.

It will be understood, therefore, that finished casings of different sizes may readily be produced from a given extruded casing, the size of the finished casing being determined by the size of the confining tube. This feature, incidental to the process, is of marked practical advantage in the manufacture of casings. A still more important advantage, from the standpoint of the user, is that, regardless of the predetermined size selected for the finished casing, the diameter may be made uniform. In this connection, it may be stated that the natural intestinal casings (for example, sheep casings) not only vary as taken from different animals, but, also, the casing from any one animal may vary considerably in diameter. As a result, it is the practice to grade intestinal casings roughly as to size, but any approximate uniformity of casings as a lot, or of an individual casing throughout its length, is an impossibility.

As has been indicated, the excess glycerin solution is expressed from the casing by the rolls C as the casing is drawn from the bath 2. While the strength of the glycerin solution may vary within certain limits, it is preferred to use about a 20% solution. The purpose is to leave incorporated in the cellulose casing, evenly distributed, a very small amount of glycerin after the drying operation. The very small percentage of glycerin which remains in the casing serves as a hygroscopic agent which attracts from the atmosphere sufficient moisture to keep the sausage casing pliable and moderately tough. This will prevent the cellulose film from cracking easily when wrinkled or crushed. On the other hand, it is desirable to avoid the use of too much glycerin, as the presence of too much glycerin would cause so much moisture to be attracted from the atmosphere as to weaken the sausage casing and prevent the sausage casing from slipping readily from the horn during the stuffing operation.

When the dried sausage casing is removed from the drier, it contains substantially no free moisture. The drying operation is not intended, however, to remove water of composition. After the dried casing remains in the air for a time, it becomes sufficiently moist to enable it to be used to best advantage in the stuffing operation. The moisture, however, is not sensibly present. That is, the casing does not feel wet, is pliable and moderately soft. The treatment is such as to preserve the strength of the dried cellulose.

The length of the section of sausage casing which is to undergo drying may vary. It has been found practicable to dry sections of about thirty-five feet in length; and such sections lend themselves well to the stuffing operation in the packing houses.

If desired, a section of about thirty-five feet in length may be shirred readily upon a paper tube of about ten or twelve inches in length, such a tube being adapted to be slipped upon the horn of a stuffing machine and fed readily therefrom during the stuffing operation. Owing to the very thin wall and desirable flexibility of a casing prepared in accordance with the present process, it is possible to load a comparatively short paper tube with a long length of casing, suited to economical stuffing operations.

The drying operation may be carried on by two operatives, one at each end of the drier. The doors 6 and 7 may be closed during the drying operation, and may be opened to enable the necessary manipulations to be made in withdrawing the dried casing and introducing a wet casing. It has been determined that a casing can be suitably dried by means of the apparatus shown, within a period of about one minute, moderately heated air being circulated through the drying chamber D. The use of an open-weave confining tube E permits the escape of moisture from the casing during the drying operation. While it is preferred to use a cloth tube, any suitable porous, or foraminous, confining tube may be employed.

While drying apparatus of the character shown, adapted to the practice of the intermittent drying process described, serves the purpose very well, it will be understood that any suitable form of drying and inflating apparatus is contemplated. In our co-pending application No. 101,959, filed April 14, 1926, is shown and described another form of apparatus for carrying out the process, broadly speaking, in a continuous manner, to the extent that the casing may be drawn from a tempering bath (such as the bath 2), in a continuous length. Thus, the casing may be taken in a continuous length from the extruding machine.

The improved process results in the production of an improved artificial casing which may be used as a casing for sausages, including wieners, etc. The improved casing may, without injury, be compactly shirred upon a supporting tube adapted to be applied to a stuffer horn. The casing possesses such qualities that it will slip readily from the stuffer horn, whereas a very moist, or wet, cellulose film will not do this, but will cling quite firmly to the supporting surface. The greater strength of a dry casing makes it possible to stuff the casing tightly and full without causing the casing to bulge, or burst. The dry casing does not stretch, as does a wet one. This insures perfectly uniform filling, with no bulging whatsoever. The possibility of insuring stuffed casings of uniform diameter is an important result of the invention. The improved casings are very light in weight and are practically inert under ordinary atmospheric conditions, and will not deteriorate. Distinct advantages are gained, therefore, in connection with storing and shipping. When the casing is taken from storage, for use in the packing house, it is ready to be filled in the condition in which the packer receives it. Wet, or very moist, casings must be soaked up. Such an operation is unnecessary where the improved casings are used. Where animal casings are used, the hanks must be untied and the salt soaked out of the strands, and water must be run through the casings before using. Such operations are unnecessary where the improved cellulose casings are employed. As has been indicated, the improved casings lend themselves to the practice of mounting the casings on short dummy tubes which can readily be applied to stuffer horns. This saves a great deal of time in the packing room. For example, where an animal intestine is used, more time is consumed in drawing the casing onto the horn than is used in stuffing the casing.

The above-described process may be used, if desired, in treating anmal intestine sausage casings. That is, a sheep casing, for example, may be treated with a dilute glycerin solution and may then be inflated and dried. In this case the use of the limiting tube may be omitted with fairly satisfactory results. On the other hand, it is preferred to use the confining tube in treating animal casings since it is thus possible to secure uniform diameter. The glycerin acts as a softening agent, as it does with cellulose casings. The natural casings, treated as indicated, can be used on paper tubes. Soaking the casings and passing water therethrough may be avoided, and the labor in the packing house may be otherwise reduced.

The foregoing detailed description has been given for clearness of understanding only, and no unnecessary limitations should be understood therefrom, but the appended claims should be construed as broadly as permissible, in view of the prior art.

What we regard as new, and desire to secure by Letters Patent, is:

1. The method of treating casings for sausages, etc., which comprises: inflating the casing by pneumatic pressure within a limiting tube, and subjecting the casing to a drying operation while thus inflated.

2. The method of treating casings for sausages, etc., which comprises: pneumatically inflating the casing within a limiting porous tube, and drying the casing while in inflated condition.

3. The method of treating casings, which comprises: pneumatically distending the casing within a limiting tube of slightly larger diameter, and drying the casing while thus distended.

4. The method of treating casings, which comprises: inflating the casing within a limiting porous tube, and passing a current of drying atmosphere in contact with said porous tube.

5. The method of finishing a cellulose casing, which comprises: passing a column of drying air under moderate pressure through the casing and thus maintaining the casing in inflated condition within a confining tube which is of a character to permit escape of moisture, and passing a drying current of air, or the like, in contact with said tube.

6. The method of treating cellulose casings, which comprises: inflating the casing under moderate pressure sufficiently to slightly enlarge its diameter, while the casing is confined against undue expansion within a limiting tube adapted to permit escape of moisture, and passing a drying current of air, or the like, in contact with said tube.

7. The process of treating a casing, which comprises: confining and inflating the casing within a porous textile tube, and circulating drying atmosphere in contact with said textile tube.

8. The method of treating a sausage casing, which comprises: confining the casing within a limiting porous tube, and passing a drying current of air, or the like, through said casing, under gentle pressure.

9. The process of treating a cellulose casing, which comprises: pneumatically distending the casing within a porous limiting tube and subjecting the tube to a drying atmosphere.

10. The method of finishing a cellulose casing, which comprises: treating the casing with a dilute glycerin solution, expressing excess solution from the casing, and drying the casing while it is inflated within a limiting surrounding wall.

11. The method of treating a cellulose casing as it comes from the purifying bath, which comprises: expressing from the casing the excess liquid of the purifying bath, immersing the casing in a dilute glycerin bath, and pneumatically distending and drying the casing while it is confined against undue distention.

12. The method of treating a cellulose casing, which comprises: introducing a length of the casing into an open-ended limiting tube, and inflating and drying said casing.

13. The method of treating a cellulose casing, which comprises: introducing a length of the casing into an open-ended limiting tube, drying said casing, and withdrawing the casing while employing it to draw another length of casing into said limiting tube.

14. The method of drying a cellulose casing, which comprises: securing one end of the casing upon a constricted tube adapted to permit escape of air, introducing said casing within a limiting tube adapted to permit escape of moisture, and passing a current of air into the other end of said casing in sufficient volume to maintain the casing in distended condition within said limiting tube while air escapes through said constricted tube.

15. Apparatus for the purpose set forth, comprising a limiting tube having walls adapted to permit passage of moisture, means for inflating a cellulose casing within said limiting tube, and means for subjecting said limiting tube to the action of a drying atmosphere.

16. Apparatus for the purpose set forth, comprising a drying chamber, means for passing a dry current through said chamber, a limiting tube mounted in said chamber and provided with walls adapted to permit passage of moisture, and means for inflating a cellulose casing within said limiting tube.

17. Apparatus for the purpose set forth, comprising a drying chamber, a limiting tube of fabric disposed longitudinally in said chamber, means for passing a drying current through said chamber, and means for maintaining in inflated condition within said tube the casing which is to be dried.

18. In apparatus for the purpose set forth, an elongated drying chamber provided on one side at its ends with doors, a limiting tube supported in said chamber and provided with walls adapted to permit escape of moisture, means for passing a drying current of air through said chamber, and means for maintaining in inflated condition within said tube the casing which is to be dried.

19. The method of treating a sausage casing, which comprises: incorporating in the casing a small percentage of a hydroscopic agent, and inflating and drying the casing.

WILLIAM F. HENDERSON.
HAROLD E. DIETRICH.